May 21, 1946.   H. HOOVER, JR   2,400,552
RANGE FINDER
Filed April 11, 1942   2 Sheets-Sheet 1

INVENTOR,
HERBERT HOOVER. JR.
BY
Reed Lawlor
AGENT.

May 21, 1946.   H. HOOVER, JR   2,400,552
RANGE FINDER
Filed April 11, 1942   2 Sheets-Sheet 2

INVENTOR,
HERBERT HOOVER, JR.
BY
Reed C. Lawlor
AGENT.

Patented May 21, 1946

2,400,552

UNITED STATES PATENT OFFICE 2,400,552

RANGE FINDER

Herbert Hoover, Jr., Sierra Madre, Calif., assignor to Consolidated Engineering Corporation, Pasadena, Calif., a corporation of California Application April 11, 1942, Serial No. 438,637

10 Claims. (Cl. 177—386)

My invention relates to direction finding and is particularly applicable to the location of sources of transient or impulsive waves. My invention finds particular use on submarines for the locations of depth bombs.

Ordinarily, in order to locate a source of impulsive or transient waves, recordings are made of the waves received at pickups located at spaced reception points. Time intervals between the reception of the waves at the points are measured on the records, and the direction to the source of waves determined from these time intervals, the speed of the wave, and the geometrical arrangement and spacing of the reception points. This method is slow and cumbersome in that it involves both recording and computation.

It is the principal object of my invention to overcome the limitations of the foregoing method by automatically detecting the time intervals elapsed between the reception of waves at different points and automatically computing the direction to the source. Another object of my invention is to provide a system for simply and visually representing the results of such computations.

To these ends, I receive the waves at pairs of points defining non-parallel base lines, detect the time interval elapsed between the reception of the wave at points on each base line, produce a force in a direction corresponding to each base line, and of an amount corresponding to the respective time intervals, vectorially combine forces corresponding to different base lines to produce a resultant force indicative of the wave arrival direction, and measure the resultant force. In the preferred form of my invention, I generate electric fields in accordance with the time intervals corresponding to two base lines, generate a beam of electrically charged particles, and deflect the beam in different directions corresponding to different base lines in amounts corresponding to the respective time intervals. The direction of the beam deflection corresponds to the direction from which the waves travel to the receiving points as measured in a plane parallel to the two base lines and the amount of the beam deflection is a measure of the speed.

When the speed of the wave is known, and the wave travels in a known plane including a base line, the angle of wave travel with respect to said base line may be determined if only the time elapsed between the reception of the wave at two points on the base line is measured. When the speed of the wave is known, and the wave travels obliquely to a plane parallel to two non-parallel base lines, the direction of travel of the wave with respect to said plane may be determined from the amount of the resultant force, or the amount of the beam deflection as the case may be.

My invention possesses numerous other objects and features of advantage, some of which together with the foregoing will be set forth in the following description of specific apparatus embodying and utilizing my novel method. It is therefore to be understood that my method is applicable to other apparatus and that I do not limit myself in any way to the apparatus of the present application, as I may adopt various other apparatus embodiments utilizing the method within the scope of the appended claims. While my invention will be particularly illustrated as applicable to certain types of waves, it is also to be understood that my invention can be applied to other types of waves as well.

To facilitate understanding the mathematical principles underlying my method of direction finding, I introduce the concept of inverse velocity. By the inverse velocity of a wave I mean a vector which points in the same direction as the direction of wave travel and has a magnitude which is the inverse of the wave speed. A component of the inverse velocity in any plane or along any line is the projection of the inverse velocity onto said plane or line. The magnitude of such a component is the inverse of the apparent wave speed in the plane or along the line as the case may be.

Figure 1:
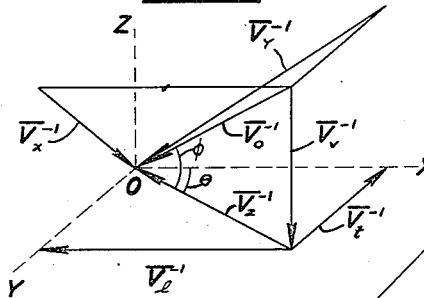
Fig. 1 is a vector diagram showing the relations between the inverse velocity of a wave in space, and the inverse velocity components along certain lines and in certain planes.

In Fig. 1, X, Y, and Z are axes of a rectangular coordinate system; axes X and Y define a horizontal plane, and axis Z is vertical.

$\overline{V}_0^{-1}$ represents the inverse velocity of a wave travelling toward the origin O from a source located at azimuth $\theta$ measured from the X axis, and elevation $\phi$. The component of the inverse wave velocity in the horizontal plane XOY is $$V_z^{-1} = V_0^{-1} \cos \phi \qquad (1)$$

The component of inverse wave velocity parallel to the Y and X axes are respectively $$V_t^{-1} = V_z^{-1} \sin \theta \qquad (2)$$

and $$V_1^{-1} = V_z^{-1} \cos \theta \qquad (3)$$

The apparent inverse velocity of the wave parallel to the Z axis is $$V_v^{-1} = V_0^{-1} \sin \phi \qquad (4)$$

The component of inverse velocity in the YOZ plane is $V_x^{-1}$, in the XOZ plane is $V_y^{-1}$, and in the XOY plane is $V_z^{-1}$. Equations for these inverse velocity components $V_x^{-1}$ and $V_y^{-1}$ may be readily obtained, but are not given here since they are not required in the discussion below. For simplicity only scalar relations are given in Equations 1 to 4. However it can readily be shown that the laws of vector addition are applicable to inverse velocity and its components. Example:

$$\overline{V}_s^{-1} = \overline{V}_t^{-1} + \overline{V}_1^{-1}$$

The velocity of the wave $\overline{V}_0$ may be determined by measuring the apparent component velocities along any three lines not parallel to the same plane, or from two component velocities measured in two non-parallel planes or in other ways. For example the velocity $$\overline{V}_0$$

may be readily obtained by taking the reciprocal of the vector sum of the inverse velocity components $$\overline{V}_t^{-1}, \overline{V}_1^{-1}, \overline{V}_s^{-1}$$

Figure 2:
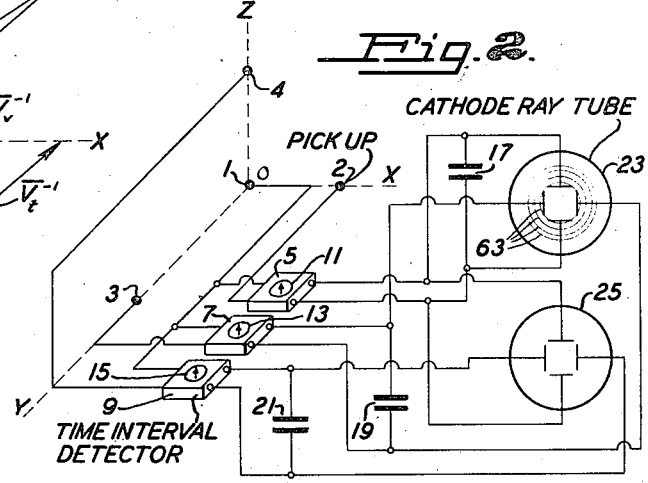
Fig. 2 is a schematic diagram illustrating apparatus useful for determining the direction of travel of a wave.

In Fig. 2, I have illustrated a method for determining inverse velocity components automatically and a system whereby inverse velocity components in two directions may be combined to yield the inverse velocity in a plane parallel to the two lines. Here a pickup 1 is located at the origin O, and pickups 2, 3, and 4 are located on axes X, Y, and Z at known distances from pickup 1. Time interval detectors 5, 7, and 9, are respectively connected to pairs of pickups lying on the three respectively base lines OX, OY, and OZ. These time interval detectors are so designed that they produce responses on their respective indicating meters, 11, 13, and 15 proportional either to the time intervals elapsed between the reception of a wave at the pair of points on the corresponding base line, or, more preferably, proportional to these time intervals divided by the distance between pickups of the respective pairs. In the latter case the respective meters indicate directly the respective components of inverse velocity along the respective base lines.

These time interval detectors may also be designed to produce voltages across condensers 17, 19, and 21, connected in the output of the time interval detectors. Each of these voltages is proportional to the respective inverse velocity components, though as will be seen, not necessarily to the same scale.

Voltages from two such time interval detectors may then be applied to corresponding pairs of deflecting plates of a cathode-ray tube having a fluorescent screen to deflect the cathode-ray beam in a direction and amount which correspond to the direction and speed of the apparent wave velocity in a plane parallel to the base lines defined by the pairs of pickups producing the voltages applied to the deflecting plates, the amount of the beam deflection actually being inversely proportional to the speed. Thus by properly combining the voltage output of time interval detectors 5, and 7, the beam displacement of cathode-ray tube 23 will indicate the inverse velocity component $$\overline{V}_s^{-1}$$

in both magnitude and direction. Similarly by applying the voltage output of time interval detectors 5 and 9 to cathode-ray tube 25, the beam displacement will indicate the inverse velocity component $$\overline{V}_y^{-1}$$

in both direction and magnitude. The beam displacement will be represented by the displacement of the visible spot produced where the beam strikes the fluorescent screen of the tube. A third cathode-ray tube could be similarly provided, if desired, to indicate the inverse velocity component $$\overline{V}_x^{-1}$$

Two of the inverse velocity components $$\overline{V}_x^{-1}, \overline{V}_y^{-1}, \text{ and } \overline{V}_z^{-1}$$

completely determine the wave velocity $$\overline{V}_0$$

In the preferred form of my invention, the time interval detectors are designed to indicate not only the time elapsed between reception of a wave at two points, but also to indicate which of said two points was first reached by the wave. By applying deflecting forces to the cathode-ray beam, in one sense or the other according to which pickup on a base line is reached first by a wave, the sense as well as the direction and speed of a velocity component in any plane may be indicated.

Figure 3:
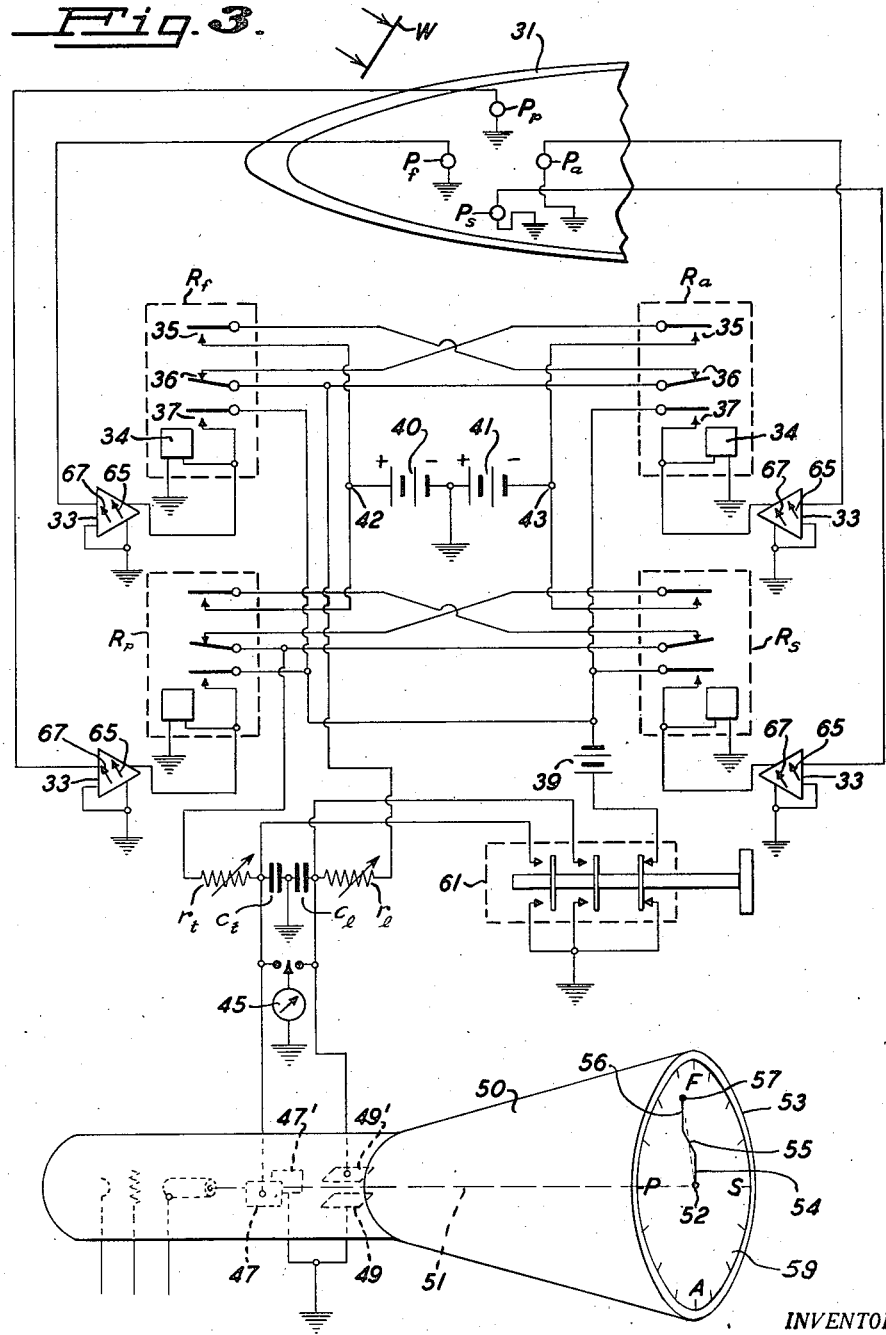
Fig. 3 is a schematic diagram illustrating the application of my invention to depth bomb location.

Referring to Fig. 3, illustrating one way of locating a depth bomb from a submarine 31, four wave pickups in the form of hydrophones are mounted on the bottom of a submarine or other vessel 31. Said pickups $P_f$, $P_p$, $P_a$, and $P_s$ are respectively located in fore, port, aft and starboard positions in a small area near the nose of the vessel. Said fore and aft pickups $P_f$ and $P_a$ define a horizontal base line parallel to the longitudinal axis of the vessel; port and starboard pickups $P_p$ and $P_s$ define a horizontal base line parallel to the transverse axis of the vessel. Said pickups $P_f$, $P_p$, $P_a$, and $P_s$ are operatively connected through individual amplifiers 33 to corresponding electromagnetic sticking relays $R_f$, $R_p$, $R_a$, and $R_s$. Each relay has a control coil 34, normally open contacts 35, normally closed contacts 36, and sticking contacts 37.

When a wave strikes any pickup, the corresponding relay is actuated, thereby closing the normally open contacts, opening the normally closed contacts, and closing the sticking contacts. When a sticking contact is closed, current flows from battery 39 through the sticking contact 37, and relay coil 34 of the actuated relay, thereby holding the contacts in the new positions assumed when the relay is actuated.

The system of relays $R_f$, $R_a$ together with resistance $r_1$, condenser $C_1$ and a potential supply comprising equally sized batteries 40 and 41, provides means for detecting the time interval elapsed between the reception of a wave at the fore and aft pickups. The system of relays $R_p$, and $R_s$ together with resistance $r_t$, condenser $C_t$ and the same potential supply, provide means for detecting the time interval elapsed between the reception of waves at port and starboard pickups $P_p$ and $P_s$.

Each of said condensers $C_l$ and $C_t$ may be charged positively or negatively through the corresponding relay system in an amount corresponding to the time interval elapsed between the reception of a wave at the corresponding pickups, and in a sense depending on which of said pickups of each pair receives the wave first.

Figure 4:
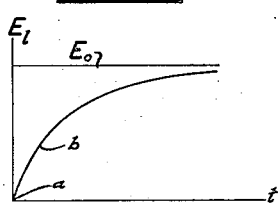
Fig. 4 is a graph representing a condenser charging process.

To illustrate the charging process, consider a wave having a steep wave front W arriving at the vessel from a depth charge exploded on the port side off the bow. In this case, the waves will reach the pickups in the sequence $P_f$, $P_p$, $P_s$ and $P_a$. At the moment that the wave strikes the fore pickup, $P_f$, relay $R_f$ will be actuated and a current will begin to flow from the positive terminal 42 of battery 40 through the now closed, but normally open contacts 35 of relay $R_f$, and the still closed, and normally closed contacts 36 of relay $R_a$, through resistance $r_l$, thus producing an increasing positive charge on condenser $C_l$. As a result, the potential across the condenser $C_l$ will increase according to the following equation:

$$E_l = E_0 \left(1 - e^{\frac{t}{r_l C_l}}\right) \quad (5)$$

represented graphically by the curve in Fig. 4.

Some time later the wave will reach aft pickup $P_a$, thereby actuating corresponding relay $R_a$, opening normally closed contact 36 of relay $R_a$, thereby disconnecting battery 40 from said condenser $C_l$, and discontinuing the charging of said condenser $C_l$. The charge and voltage across the condenser will thereafter remain substantially constant and will be a measure of the time interval elapsed between the reception of the wave at the fore and aft pickups. If the wave had reached the aft pickup before it reached the fore pickup, the negative end 43 of battery 41 would have been connected to the condenser for said time interval through the normally open contact 35 of relay $R_a$, and the normally closed contact 36 of relay $R_f$, thus charging the condenser negatively. The polarity of the voltage across the condenser thus indicates which of the pickups $P_f$ and $P_a$ was reached first by the wave.

In a similar manner, the other condenser $C_t$ may be charged from the batteries 40 and 41 through resistance $r_t$ and through the system of relays $R_p$ and $R_s$ by an amount corresponding to the time elapsed between the reception of the wave at the pickups $R_p$ and $R_s$ and positively or negatively, according to whether the wave source is on the port or starboard side of the vessel. In the particular case here illustrated a positive potential is produced across each condenser $C_l$ and $C_t$ to ground. If the wave travels in a horizontal plane, these two potentials determine the wave velocity uniquely. These potentials may if desired be measured in any convenient manner such as by connecting a ballastic galvanometer or potentiometer 45 across each condenser in turn.

To determine the direction to the source automatically, the potentials across condensers $C_l$ and $C_t$ are simultaneously applied across the vertical deflection plates 47, 47' and the horizontal deflection plates 49, 49' respectively, of cathode-ray tube 50. The electric fields between the respective pairs of deflection plates force the electron beam 51 vertically or horizontally as the case may be in amounts corresponding to the voltages across the deflection plates.

If the time constants $$T_l = r_l C_l \quad (6)$$

and $$T_t = r_t C_t \quad (7)$$

of the two condenser charging circuits is made large compared to the maximum time interval that can possibly elapse between the reception of a wave at a pair of reception points on the respective base lines, the voltages across the two condensers will vary substantially linearly with time as indicated by the steep portion $ab$ of the curve in Fig. 4 and will be given respectively by the equations $$E_l = E_0 \frac{t_l}{T_l} \quad (8)$$

and $$E_t = E_0 \frac{t_t}{T_t} \quad (9)$$

where $t_l$ and $t_t$ are respectively the times elapsed between the reception of the wave at pickups parallel to the longitudinal and transverse axes of the vessel. These time intervals $t_l$ and $t_t$ divided by the distance between the respective reception points are measures of the corresponding inverse velocity components, due regard being taken for the sense of the component according to which pickup in each pair receives the wave first. Preferably, the values of the resistances $r_l$ and $r_t$ are adjusted to such values that equal horizontal and vertical beam deflections represent equal inverse velocity components. In this case, the time constants of each condenser charging circuit will be proportional to the distance between the corresponding pair of pickups and inversely proportional to the deflection sensitivity of the deflection plates to which it is connected. Another way to make the beam deflection in the two directions represent equal inverse velocity components is to utilize for the deflection force only an appropriate fraction of the voltage across the condenser connected to the more sensitive deflection plates. Said fraction will be given by the ratio of the deflection sensitivities of the two sets of plates and may most conveniently be obtained by replacing the appropriate condenser by two series connected condensers and applying the voltage across one of the condensers to the more sensitive deflection plates. In effect these condensers are a capacitive potential divider.

It is clear that if the pickups on the two base lines are equally spaced, the time interval elapsed between the reception of the waves between the transversely located pickups $P_p$ and $P_s$ and the time interval elapsed between the longitudinally located pickups, $P_f$ and $P_a$ are given by the following equations:

$$t_t = t_0 \sin \theta \quad (10)$$

and $$t_l = t_0 \cos \theta \quad (11)$$

where $t_0$ is the time required for the wave to travel between a pair of pickups if the wave front is perpendicular to either base line. Under such conditions the direction of beam deflection will indicate the direction from which the waves arrive, and the amount of beam deflection will be inversely proportional to the speed of the wave.

The effect of the wave reception at the various pickups on the motion of the cathode-ray beam spot will now be illustrated in detail. When the wave strikes the fore pickup $P_f$, and increasing positive potential is applied to the upper vertical deflection plate 49', causing the beam spot to move from its normal position 52 vertically across the face 53 of the cathode-ray tube along the path represented by line 54. When the wave strikes port pickup $P_p$, an increasing positive voltage is applied to the left horizontal deflection plate 47 so that the beam spot now moves upward and to the left of the cathode-ray tube face at an angle of 45° along a path represented by line 55. When the wave reaches the starboard pickup $P_s$ charging of condenser $C_1$ ceases and the horizontal deflection of the beam remains fixed while the beam continues to move upward along the path represented by line 56 by virtue of the continuously increasing voltage across the condenser $C_1$. When the wave strikes the aft pickup $P_a$, charging of condenser $C_1$ ceases and the spot remains stationary in a position 57 near the circumference of the cathode-ray tube face. The resultant beam deflection represented by the dashed line joining points 52 and 57 makes an angle $\theta$ with a vertical line on the face equal to the angle that the source of the wave is off the bow of the submarine, and is on the left half of the face indicating that the depth bomb is on the port side of the vessel. The vertical and horizontal displacements respectively of the beam spot indicate the apparent velocity of the wave along the longitudinal and transverse axes of the vessel in both magnitude and sense. This component may be separately measured if desired by cross-section lines (not shown) scribed on the tube face.

For convenience in determining the location of the depth bomb, the cathode-ray tube face is marked with the letters "F" at the top, "A" at the bottom, "P" on the left, and "S" on the right, which symbols represent respectively the fore, aft, port, and starboard directions. A circle 59 on the face of the tube is indexed to read in degrees.

If the velocity of the wave is known, and it is known that the wave travels horizontally in the plane parallel to the base lines defined by the pickups (which is true in the case of a submarine which is locating a depth bomb) or in a plane forming a fixed dihedral angle with the foregoing plane, the voltage across either condenser $C_t$ and $C_1$ alone is a measure of the direction to the depth bomb, and the other pair of pickups may be omitted. For example, if the fore and aft pickups are used, the direction to the wave source is given by the equation $$\theta = \pm \sin^{-1}\frac{t_1}{t_0} \qquad (12)$$

if the pickups lie in a horizontal plane. If the depth bomb was laid by a destroyer on either the port or the starboard side of the ship, the sign to be used in this equation is known.

After the direction to the depth bomb is determined with potentiometer 45 or by inspection of the cathode-ray tube face 53, a reset switch 61 is pushed in momentarily thereby discharging condensers $C_t$ and $C_1$ to ground, and opening the circuit from battery 39 to the relay coils 34 thus reestablishing the initial operating condition of the apparatus so that it is in condition to measure the direction to a new depth bomb.

Figure 5:
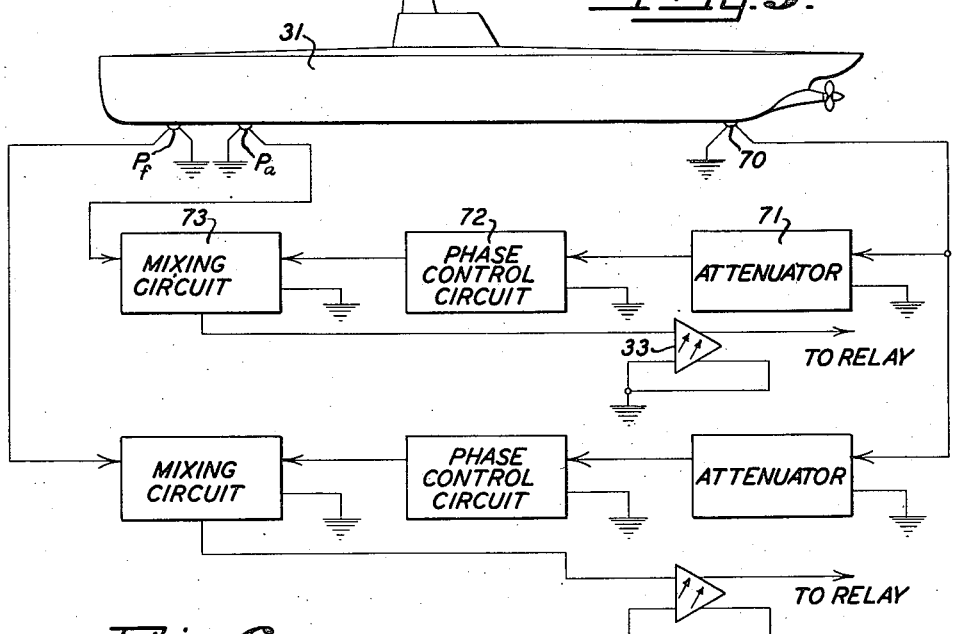
Fig. 5 is a schematic diagram illustrating how detrimental effects due to undesirable noises of local origin on a submarine may be avoided.

When my system is applied to depth bomb location while the vessel is in operation, disturbing effects due to engine noise, or propeller wash may be greatly reduced and sometimes completely eliminated in any one of three ways acting separately or cooperatively. In the first, threshold values of automatic volume controls 65 of the amplifiers 33 are set at such values that the relays will not be actuated unless a wave is received stronger than any due to engine noise, etc. In the second, the relay systems may also be made relatively insensitive to engine and propeller noise but sensitive to waves from a depth bomb by proper adjustment of the filter controls 67 in the amplifiers. A third way of reducing or eliminating the disturbing effects due to engine noise or propeller noise is illustrated schematically in Fig. 5. Here an auxiliary pickup 70 is mounted on the vessel adjacent the source of noise, so that the fraction of the output signal produced by said pickup due to any wave from a depth bomb is smaller than for any of the other pickups. The output of auxiliary pickup 70 is then passed through an attenuator 71 and a time phase control circuit 72 which are set so that when the signal from auxiliary pickup 70 is applied to a mixing circuit 73, together with signals from each of the other pickups $P_t$, $P_p$, $P_a$, or $P_s$, it balances out any noise from that source reaching said other pickup, and the combined output of the mixing circuit is applied to the amplifier connected to said other pickup. An attenuator, phase control, and mixing circuit connected to said auxiliary pickup 70 is provded for each of the other pickups.

Figure 6:
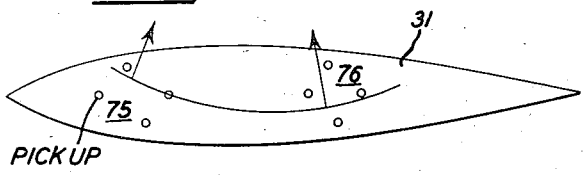
Fig. 6 is a schematic diagram used to illustrate how a depth bomb may be located both in direction and in distance.

If two sets of direction-finding equipment are connected to groups of pickups placed at different parts 75 and 76 on the vessel as illustrated in Fig. 6, the actual distance to the depth bomb may be determined by triangulation. Since the side of the vessel on which the depth bomb is located may be determined with one group of pickups defining two non-parallel base lines, the other group need contain only two pickups. If the general direction from which a wave is traveling is known, only one pair of pickups need be placed in each group. In any case the centers of the groups of pickups are preferably spaced apart a distance large compared to the distance between pickups connected to each time interval detector.

Two such cathode-ray tubes and associated relay systems as that illustrated in Fig. 3 may be utilized in the system shown in Fig. 2 to determine the direction in space to a wave source as hereinbefore explained. If the speed with which the wave travels is known, and the source of waves is above the horizontal plane (as it normally will be), pickup 4 may be omitted together with the cathode-ray tube 25 which responds to a wave received by this pickup. In this case the total cathode-ray beam spot displacement on the face of tube 23 will be proportional to the inverse velocity component $V_z^{-1}$ of the wave in a horizontal plane. Consequently, if the speed of the wave is known, the elevation of the source is given by the equation $$\phi = \cos^{-1}\frac{V_z}{V_0}$$

To simplify such determinations, circles 63 marked on the face of the cathode-ray tube 63 may be calibrated in elevation.

It is clear that the base lines passing through the pairs of pickups between which the time intervals are measured need not intersect so long as they are not parallel. It is also clear that the base lines need not be, though they preferably are, at right angles. In any case they should preferably make an angle of at least about 45° with each other. If they are at some other angle than 90°, a cathode-ray tube may be built which utilizes deflecting means arranged to deflect the beam in directions making an angle with each other the same as the angle between the base lines; or if an ordinary cathode-ray tube is used, the face of the tube may be readily calibrated in both angle and speed.

From the foregoing discussion of my invention, it is seen, that I have provided a simple and efficient method of locating sources of wave energy.

I claim:

1. In a direction finder, a pair of wave pickups located at spaced points, a relay associated with each pickup and actuatable upon reception of a wave by said each pickup, each relay having a normally open connection and a normally closed connection, a potential source, a condenser charging circuit arranged to be connected to said source upon first actuation of either relay through the normally open connection thereof and the normally closed connection of the other relay and to be disconnected from the potential source on actuation of said other relay, and means of measuring the potential produced across the condenser.

2. In a direction finder, a pair of wave pickups located at spaced points, a relay system associated with said pickups, a condenser charging circuit arranged to be chargeable through said relay system to a polarity depending upon which of the pickups is first actuated by a wave, and means for indicating the polarity of the charge on said condenser.

3. In a direction finder adapted for the determination of the direction of arrival of a wave in an area including a plurality of wave pickups located at spaced points in the area and defining two non-parallel base lines, the combination of a condenser, associated with a pair of pickups on each said base line, means associated with each condenser actuated by a wave first received at either pickup of said pair for initiating the charging of each condenser, means cooperating with each charging circuit and actuated by a wave energy received at the other pickup of said pair for discontinuing the charging of said each condenser, a cathode-ray tube having two plates adapted to deflect the tube beam in two corresponding directions, and deflection control means connecting each condenser to one of said plates.

4. In a direction finder adapted for the determination of the direction of arrival of a wave in an area including a plurality of wave pickups located at spaced points in the area and defining two non-parallel base lines, the combination of a cathode-ray tube having two plates adapted to deflect the tube beam in two corresponding directions, means connected to each deflecting plate responsive to reception of waves at a pair of points on a corresponding base line for producing a potential on said plates of an amount corresponding to the time interval elapsed between the reception of the wave at the two points and of a sense depending on which of said points the wave reaches first.

5. In a direction finder, a pair of mutually spaced pickups mounted on a vessel, an auxiliary pickup mounted near a source of disturbance on the vessel, a wave detecting circuit connected to each pickup, means including an amplitude control circuit and a time phase control circuit connecting said auxiliary pickup and each pickup of said pair in such a way as to reduce the amount of disturbance from said source that would otherwise reach each said detecting circuit from the corresponding pickup, and means connected with said circuits arranged to produce a response corresponding to the time elapsed between the reception of a wave from another source at pickups of said pair.

6. In a range finder, two groups of wave pickups, spaced apart a distance large compared to the distance between pickups in each group, one group comprising two pairs of pickups defining two non-parallel base lines, the other group comprising at least one pair of pickups, and a time interval detector operatively associated with each pair of pickups and adapted to produce a response corresponding to both the direction of a wave and the time elapsed between the reception of such wave at the pickups of each pair.

7. In a range finder, two groups of wave pickups, said groups being spaced apart a distance large compared to the distance between pairs of pickups in each group, a time interval detector operatively associated with each pair of pickups and adapted to produce a response corresponding to both the direction of a wave and the time elapsed between the reception of such wave at the pickups of said each pair.

8. In a direction finder, three pairs of wave pickups defining three non-parallel base lines definable in terms of X, Y, and Z coordinates, a time interval detector operatively associated with each pair of pickups and adapted to produce a response corresponding to both the direction of a wave and the time elapsed between the reception of such wave at the pickups of said each pair, and means for indicating the response of each said time interval detector.

9. In a direction finder, a pair of wave pickups located at spaced points; a relay responsively coupled to each pickup; each relay having a normally open connection and a normally closed connection; a source of potential having a center connection; a condenser; and a pair of condenser charging circuits for said condenser, each of said charging circuits including a different half of said source of potential, the normally closed contacts of one of said relays and the normally open contacts of the other of said relays, whereby said condenser will be charged in accordance with the direction of approach of a wave and for a period determined by the interval between the arrival of such wave at said pickups.

10. In a direction finder a pair of spaced wave pickups, a condenser-charging circuit comprising a condenser and a voltage source for charging the condenser and means responsive to the pickup first receiving the wave for closing the circuit, and means responsive to the other pickup for opening the circuit, the means responsive to one of the pickups serving to apply the voltage to the condenser in one polarity when the latter pickup first receives the wave, and the means responsive to the other pickup serving to apply the voltage to the condenser in the other polarity when the latter pickup first receives the wave.

HERBERT HOOVER, Jr.